United States Patent [19]

Kobayashi

[11] Patent Number: 5,589,846
[45] Date of Patent: Dec. 31, 1996

[54] HEAD MOUNTED IMAGE DISPLAY

[75] Inventor: Hiroyoshi Kobayashi, Hachioji, Japan

[73] Assignee: Olumpus Optical Co., Ltd., Tokyo, Japan

[21] Appl. No.: 404,149

[22] Filed: Mar. 14, 1995

[30] Foreign Application Priority Data

Mar. 17, 1994 [JP] Japan .................................. 6-047187

[51] Int. Cl.⁶ ...................................... G09G 3/02
[52] U.S. Cl. ................. 345/8; 359/630; 340/980
[58] Field of Search ..................... 345/8, 7, 9; 379/430;
381/187, 183; 348/795, 61; 340/980; 359/630,
631, 632, 13, 14

[56] References Cited

U.S. PATENT DOCUMENTS

| 5,003,300 | 3/1991 | Wells | 345/8 |
| 5,117,465 | 5/1992 | MacDonald | 381/187 |
| 5,233,650 | 8/1993 | Chan | 379/430 |
| 5,276,471 | 1/1994 | Yamauchi et al. | 345/8 |
| 5,321,416 | 6/1994 | Bassett et al. | 345/8 |

FOREIGN PATENT DOCUMENTS

| 2-47688 | 2/1990 | Japan | 345/8 |
| 3188777 | 8/1991 | Japan . | |
| 6141308 | 5/1994 | Japan | 379/430 |

Primary Examiner—Kee M. Tung
Assistant Examiner—Doon Chow
Attorney, Agent, or Firm—Cushman, Darby & Cushman IP Group of Pillsbury Madison & Sutro LLP

[57] ABSTRACT

A head mounted image display includes an image display body for projecting an image on each eye of an observer and a mount supporting device capable of removably mounting the image display body on the observer's head. The mount supporting device has a sinciput contact member and left and right occiput contact members. When the sinciput contact member and the left and right occiput contact members come into contact with the corresponding parts of the head, resistance forces are produced in the contact parts of the left and right occiput contact members by the moment of gravity of the image display body. The image display body can be supported by the contact force of the sinciput contact member and the resistance forces acting on the contact parts of the left and right occiput contact members. In this way, the image display body is firmly supported in a correct mounting state and an image observation can be favorably made.

23 Claims, 5 Drawing Sheets

HEAD MOUNTED IMAGE DISPLAY

BACKGROUND OF THE INVENTION

1. Field of the Invention

This Invention relates to an image display which is removably mounted on the head of a viewer to project an image on each eye of the viewer, and in particular, to an improvement of mount supporting means for firmly mounting and supporting an image display body on the head of the viewer in his desired state.

2. Description of Related Art

Recent years have seen many developments in image displays in which a virtual image can be observed in such a way that an image derived from an image display element, such as a small-sized CRT or liquid crystal display element, is projected directly on each eye of a viewer and thereby the image looks as if it were projected in the air, that is, in head mounted image displays used to be removable for mounting on the head, including the face, of the viewer.

In general, the head mounted image display of prior art comprises an image display body for projecting an image on each eye of a viewer and mount supporting means for removably mounting and supporting the image display body on the head of the viewer including his face.

In the head mounted image display of this type, it is necessary to facilitate its handling and operation and suppress a sense of fatigue or discomfort of the viewer to a minimum during use. Hence, compact and lightweight design of the entire display is required. At the same time, in order that the viewer can easily have experience of an image observation which is rich in theatrical atmosphere, it is important that a relatively small picture of the image display element can be magnified and observed to bring about such an effect that the viewer feels as if he saw a large-sized picture.

In order to hold the image display body at a predetermined front position close to the viewer's eyes, the conventional head mounted image display of this type, as is well known, is generally mounted on the viewer's head, from the sinciput (forehead) through left and right temples to the occiput, by means of a band-like mount supporting member so that the image display body is supported by the mount supporting member.

With the mount supporting member of the conventional head mounted image display mounted on the viewer's head including his face, however, the image display body, which occupies a great part of the image display and has a relatively heavy weight, is situated in a projection state at the predetermined front position close to the viewer's eyes. As a result, the center of gravity of the image display will be deviated forward. In a state where the image display is mounted and supported on the viewer's head, the image display body itself tends to slip down due to gravity. This causes the disadvantage that the viewer cannot make a correct image observation.

SUMMARY OF THE INVENTION

It is, therefore, an object of the present invention to provide a head mounted image display which prevents an image display body from slipping down during use and can always firmly maintain the entire image display in a desired state with respect to an observer's head.

In order to achieve this object, the head mounted image display of the present invention is equipped with an image display body for projecting an image on each eye of an observer and mount supporting means capable of removably mounting the image display body on the observer's head including his face. The mount supporting means has at least a sinciput contact member which can contact with the observer's head between the forehead and the crown of the head and left and right occiput contact members which can contact with the lower portions of left and right occiputs of the observer. When the sinciput contact member and the left and right occiput contact members come into contact with the corresponding parts of the head, resistance forces are produced in the contact parts of the left and right occiput contact members by the force an gravity of the image display body. The image display body can be supported by the contact force of the sinciput contact member and the resistance forces acting on the contact parts of the left and right occiput contact members. In this way, the image display body is always firmly sustained in a correct mounting state as desired.

Further, the head mounted image display of the present invention includes contact member position adjusting means capable of changing the relative position of at least one of the sinciput contact member and the left and right occiput contact members with respect to the image display body. Thus, in accordance with the individual difference in shape (notably, size) of the observer's head, the image display can be selectively mounted at the optimum position on the observer's head.

Still further, the head mounted image display of the present invention is designed so that members coming in contact with the corresponding parts of the left and right occiput contact members are composed of elastic hollow pads. Therefore, in accordance with the force of gravity an the image display body, reaction forces acting on the corresponding parts are effectively absorbed.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
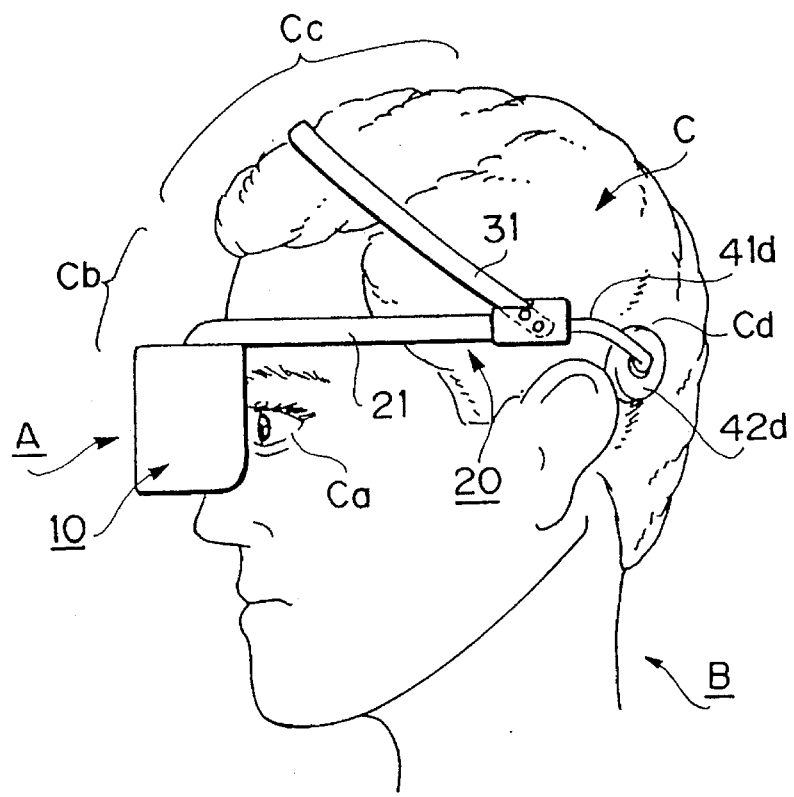
FIG. 1 is a side view schematically showing the construction of the head mounted image display, mounted on an observer's head, in a first embodiment of the present invention.

Referring to the drawings shown, the embodiments of the head mounted image display according to the present invention will be described in detail below.

Figure 2:
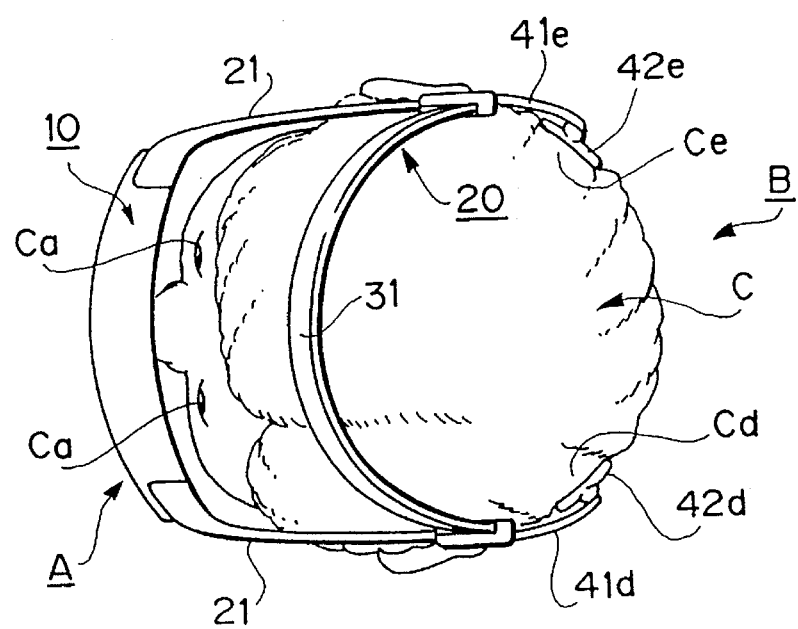
FIG. 2 is a top view showing the construction of the head mounted image display in the first embodiment.
Figure 3:
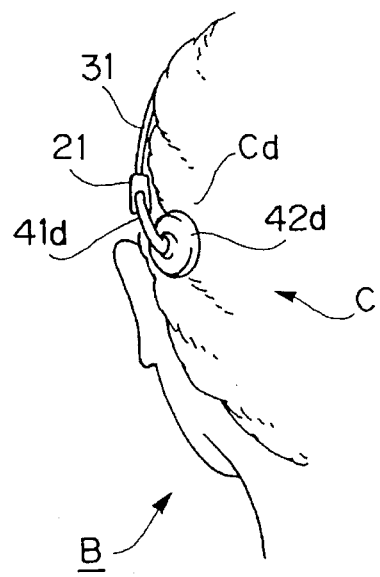
FIG. 3 is a rear view for explaining an example of the case where a left occiput contact member contacts with the observer's head in the first embodiment.

In FIGS. 1 to 3, a head mounted image display A in the first embodiment is constructed with an image display body 10 for magnifying and projecting an image on each of eyes Ca of an observer B and a mount supporting mechanism (mount supporting means) 20 capable of removably mounting and supporting the image display directly on a head C of the observer B including his face.

The image display body 10, as well known from the past, may well be designed to have, for example, a liquid crystal display element as an image display element, image display means for displaying an image on the display surface of the liquid crystal display element, and an optical system for magnifying the displayed image and projecting it on each eye of the observer.

The mount supporting mechanism 20, on the other hand, comprises main frame members 21 which are shaped to the head C of the observer B including his face, ranging from left and right temples to the front of the face, and which suspend the image display body 10 from their front ends so that the image display body 10 can be located at a predetermined position close to the eyes Ca of the observer B; a sinciput contact member 31 which is capable of contacting with the sinciput ranging from a forehead Cb to a crown Cc of the head of the observer B and is pivotally supported by the main frame members 21, or is shaped into the form of a band fixed and held thereto; and left and right occiput contact members 41d and 41e having elasticity which are provided with pressing buffer pad pieces 42d and 42e capable of contacting elastically with lower portions Cd and Ce of left and right occiputs, respectively, of the observer B at their extension ends and which are each integrally extended from the rear end of the main frame member 21.

Hence, in the head mounted image display A according to the first embodiment, the image display body 10 is mounted on the head C of the observer B by the mount supporting mechanism 20, and thereby the image display A, namely the image display body 10, can be supported at the predetermined position located In front of the eyes Ca of the observer B. Consequently, an image observation can be made as desired.

In the case where the image display A is mounted and supported on the head C of the observer B in this manner, the weight of the entire display is practically occupied by that of the image display body 10 because of the contacts of members constituting the mount supporting mechanism 20 with the corresponding parts, namely the contact of the sinciput contact member 31 with the sinciput ranging from the forehead Cb to the crown Cc of the head, and the contacts of the buffer pad pieces 42d and 42e of the left and right occiput contact members 41d and 41e with the lower portions Cd and Ce of the left and right occiputs. Thus, by the contact part of the sinciput contact member 31, notably by the moment created by the force an gravity of the image display body 10 acting as its supporting point at the top of the contact part, resistance forces are produced as reaction forces to the force of gravity at the contact parts of the left and right occiput contact members 41d and 41e. Furthermore, because the contact parts of the left and right occiput contact members 41d and 41e correspond to the lower potions Cd and Ce of the left and right occiputs, the image display A, namely the image display body 10, can be mounted and supported effectively and stably with great ease.

In the first embodiment, as mentioned above, the pressing hollow buffer pad pieces 42d and 42e capable of contacting elastically are interposed with respect to the contact parts of the left and right occiput contact members 41d and 41e. As such, the mounting of the image display A on the head C does not cause a disagreeable sensation to the observer B. Moreover, elastic forces directed toward the occiputs are made to act on the left and right occiput contact members 41d and 41e, thereby bringing about a better state of pressing against the contact parts. As a result, a mounting sensation of the image display A is improved.

Figure 4:
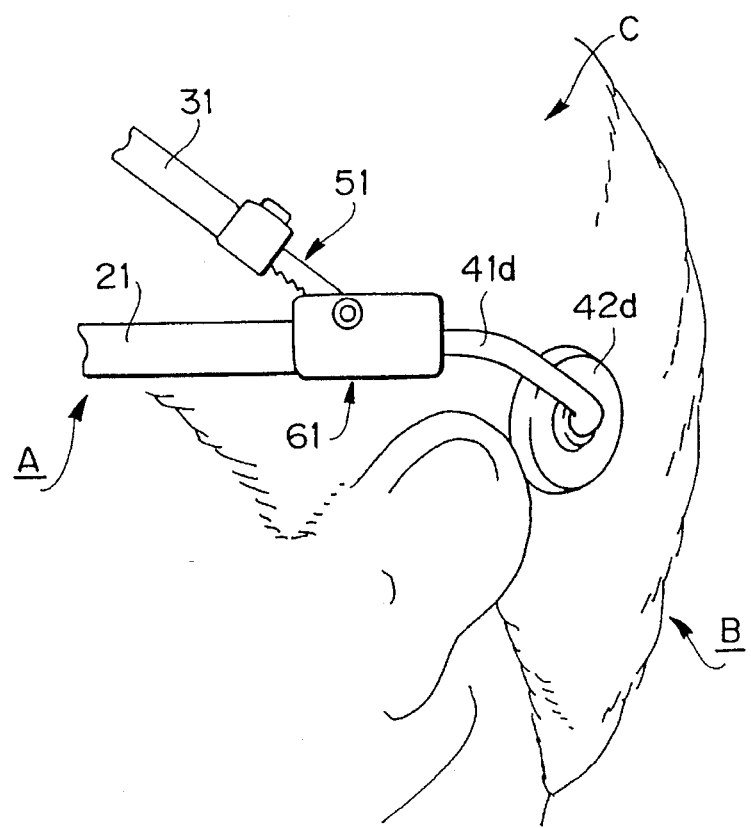
FIG. 4 is a perspective view schematically showing essential parts of the head mounted image display, mounted on the observer's head, in a second embodiment of the present invention.
Figure 5:
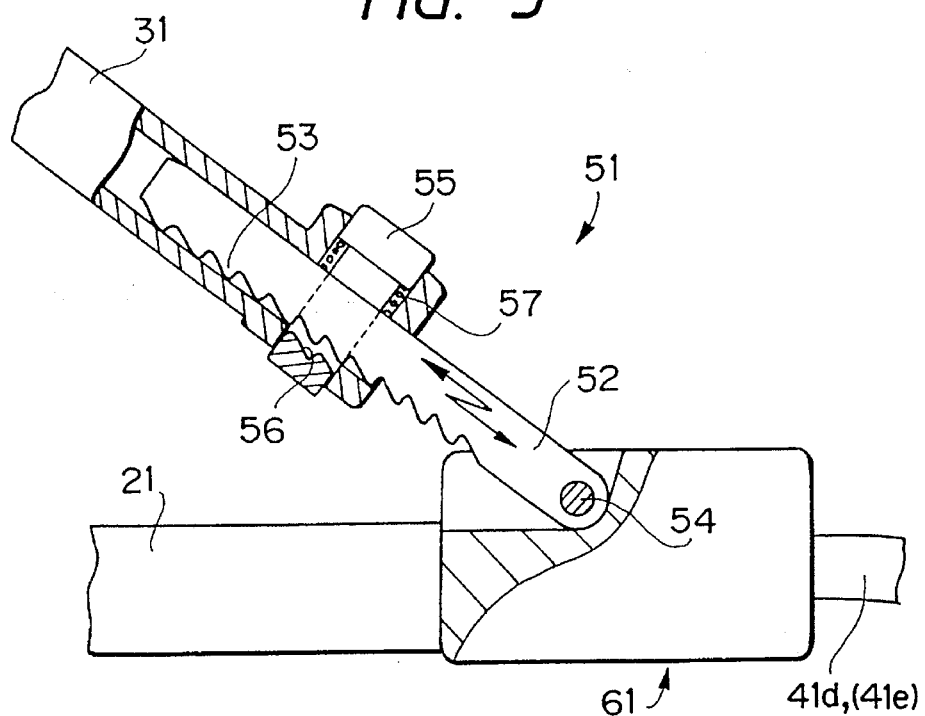
FIG. 5 is a partially sectional side view of enlarged essential parts schematically showing an example of each position adjusting mechanism of a sinciput contact member in the second embodiment.
Figure 6:
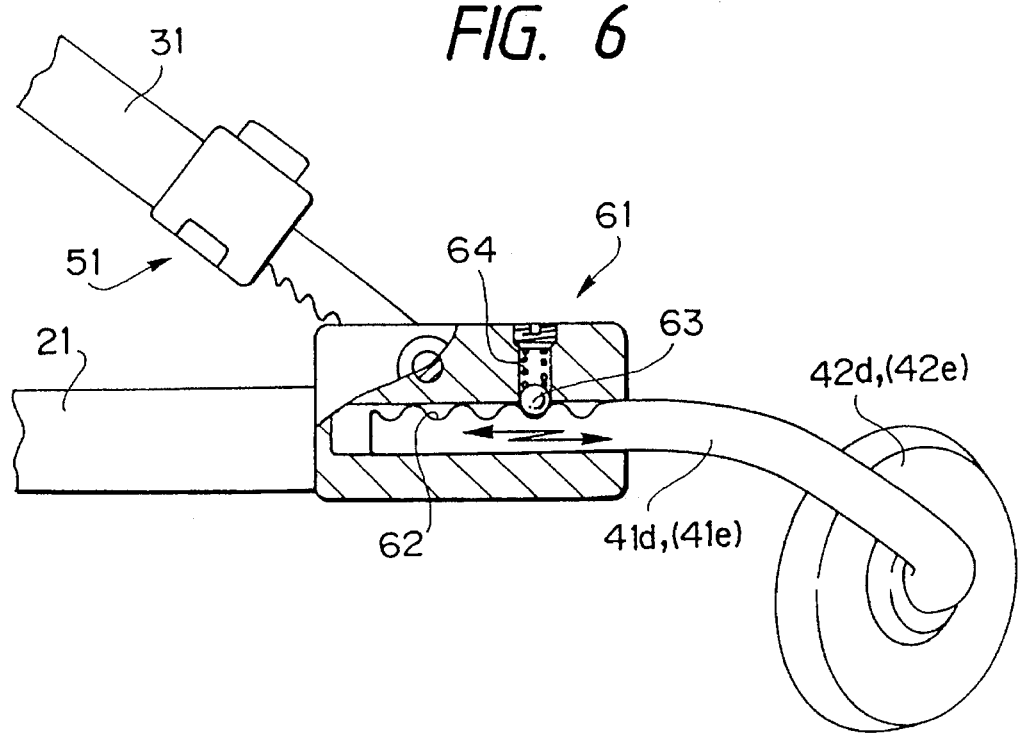
FIG. 6 is a partially sectional side view of enlarged essential parts schematically showing an example of each position adjusting mechanism of left and right occiput contact members in the second embodiment.

The second embodiment, as Illustrated in FIGS. 4 to 6, is equipped with position adjusting mechanisms (contact member position adjusting means) 51 and 61 capable of changing the relative positions, with respect to the image display body 10, of the sinciput contact member 31 and the left and right occiput contact members 41d and 41e, so that adjustments of the position adjusting mechanisms 51 and 61 make It possible to selectively mount the image display at the optimum position of the head in accordance with the individual difference in shape (notably, size) of the head C of the observer B.

Specifically, for each of the position adjusting mechanisms 51 of the sinciput contact member 31, it is necessary only that design is made to change the holding length and angle of the sinciput contact member 31 substantially sustained by the main frame member 21. For example, as shown in FIG. 5, it may well be a ratchet system such that an adjusting piece 52 is provided with a sawtooth engaging portion 53 of a predetermined length on its one edge and is pivotally supported with an axis pin 54 at the corresponding part of the main frame member 21, while at the end of the sinciput contact member 31, an engaging knob 55 is slidably mounted which receives the adjusting piece 52 so as to move back and forth inside the end and which has an engaging claw 56 selectively locked to the engaging portion 53 by the elastic force of a spring 57.

On the other hand, for each of the position adjusting mechanisms 61 of the left and right occiput contact members 41d and 41e, it is necessary only that design is made to adjust the projected length of each of the left and right occiput contact members 41d and 41e substantially extended from the main frame member 21. For example, as shown in FIG. 6, an engaging concave portion 62 of a predetermined length is formed on one edge of each of the contact members 41d and 41e and an engaging piece (engaging ball) 63 is disposed which is situated on the side of the main frame member 21 and is selectively engaged with the engaging concave portion 62 by the elastic force of a spring 64.

Hence, in the second embodiment, the position adjusting mechanism 51 of the sinciput contact member 31 shown in FIG. 5 is constructed so that the locking position of the engaging claw 56 is shifted with respect to the engaging piece 53 of the adjusting piece 52 by the operation of the engaging knob 55, thereby allowing an arbitrary setting of the holding length of the sinciput contact member 31, that is, the length corresponding to the shape of the head C of the observer B. At the same time, the pivotal mounting of the adjusting piece 52 by the axial pin 54 makes it possible to arbitrarily set the holding angle of the sinciput contact member 31, namely the contact position corresponding to the shape of the head C of the observer B.

On the other hand, the position adjusting mechanism 61 of each of the left and right occiput contact members 41*d* and 41*e* shown in FIG. 6 is designed so that each of the left and right occiput contact members 41*d* and 41*e* is operated in such a manner as to move back and forth, against the engaging elastic force applied to the engaging concave portion 62 by the spring 64 of the engaging piece 63, with respect to the main frame member 21, and thereby each contact position of the left and right occiput contact members 41*d* and 41*e*, namely the contact position corresponding to the shape of the head C of the observer B, can be set at will.

Figure 7:
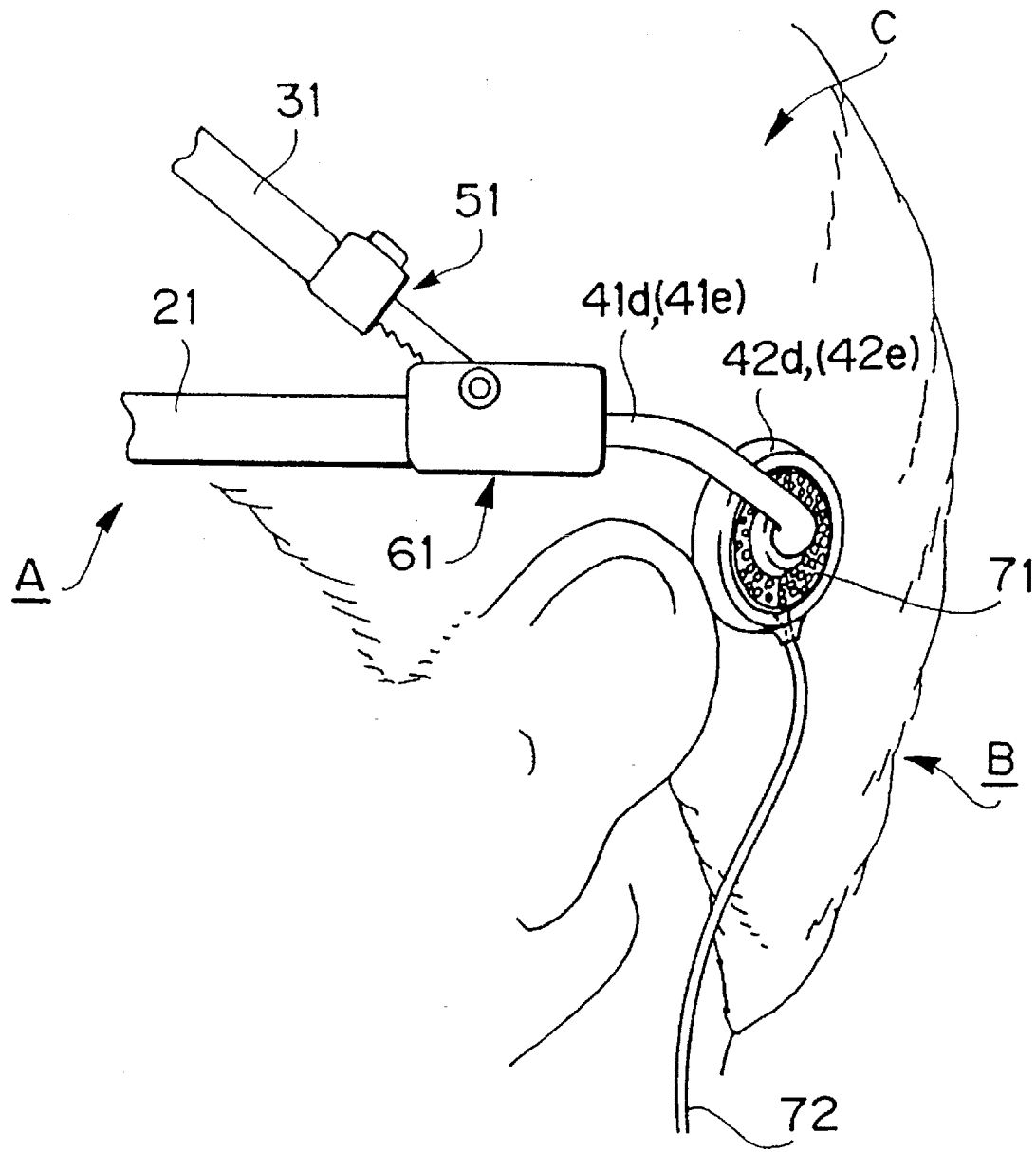
FIG. 7 is a perspective view schematically showing essential parts of the head mounted image display, mounted on the observer's head, in a third embodiment of the present invention.

The third embodiment, as depicted in FIG. 7, is designed so that a speaker 71 having bass characteristics is incorporated In each of the buffer pad pieces 42*d* and 42*e* of the left and right occiput contact members 41*d* and 41*e* in contact with the lower portions Cd and Ce of the left and right occiputs, and is connected by a cable 72 with an external acoustical system. Thus, in the third embodiment, the sounds of bass from the speaker 71 become vibrations, which are propagated to the occiput, and as such the theatrical atmosphere in the image observation of the image display can be further improved.

Figure 8:
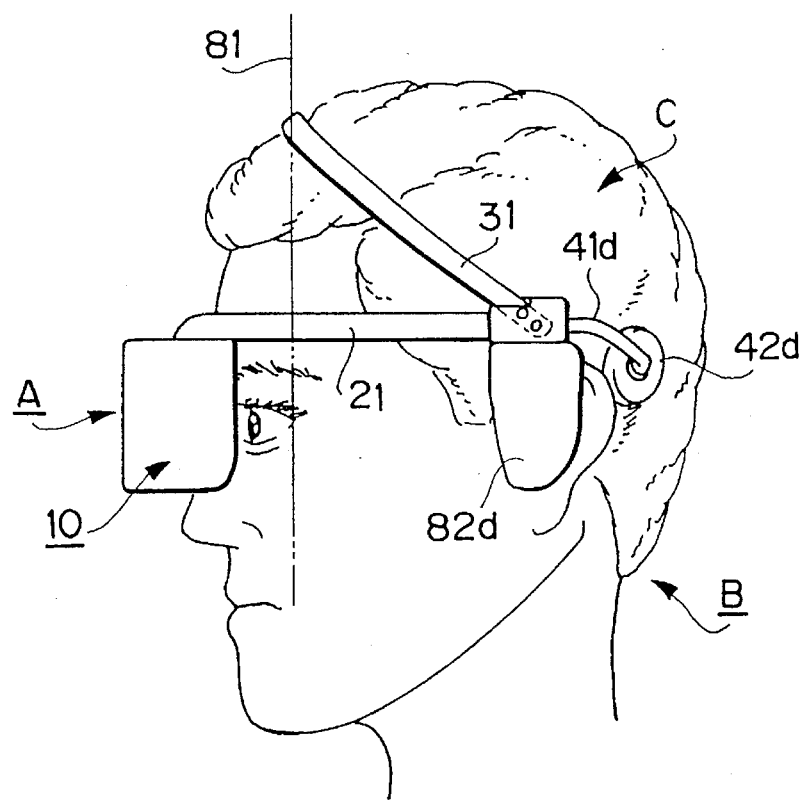
FIG. 8 is a side view schematically showing the construction of the head mounted image display, mounted on the observer's head, in a fourth embodiment of the present invention.
Figure 9:
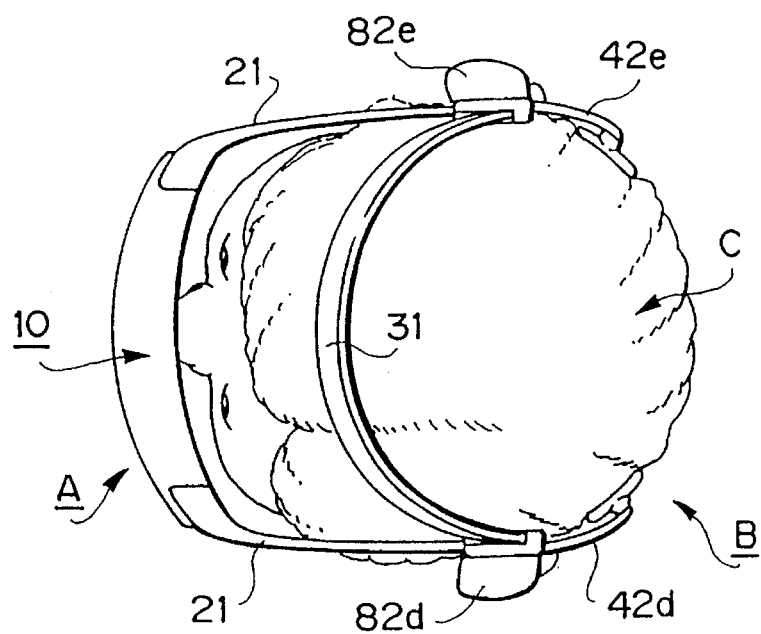
FIG. 9 is a top view showing the construction of the head mounted image display in the fourth embodiment.

The fourth embodiment, as shown in FIGS. 8 and 9, is constructed so that speakers 82*d* and 82*e* for hearing sounds accompanying the display of an image are mounted at the ends of the main frame portions 21, and the position of the sinciput contact member 31 being in contact with the sinciput ranging from the forehead Cb to the crown Cc of the head is set on or close to a center of gravity 81 of the entire image display.

Thus, in the fourth embodiment, since the contact position of the sinciput contact member 31, namely its supporting position, is set on or close to the center of gravity 81 of the entire image display, the mounting of the entire image display is physically well balanced. Consequently, the resistance forces produced in the contact parts of the left and right occiput contact members 41*d* and 41*e* corresponding to the force of gravity of the image display body 10 are eliminated or reduced. The contact forces of the contact members 41*d* and 41*e* applied to the contact parts need to merely fix the entire image display, and therefore the image display body 10. Thus, the stability of the mounting of the image display can be further improved, and the observer's operation load can be reduced during the image observation.

In the embodiments mentioned above, the part of the sinciput contact member 31 contacting with the head may be constructed of a man-made or natural leather, rubber with a hardness of 30–60, or foamed urethane with an expansion rate of 20–80% and a compression rate of 0–⅓. The sinciput contact member 31 may be made of plastic, such as polypropylene or polyethylene, or metal. Each of the buffer pad pieces 42*d* and 42*e* is hollow and may also be made of foamed urethane with an expansion rate of 20–80% and a compression rate of 0–⅓, or rubber with a hardness of 30–60. The main frame member 21 may well be constructed of plastic containing carbon, glass, or metal.

What is claimed is:

1. A head mounted image display comprising:

an image display body for projecting an image on each eye of an observer; and mount supporting means for removably mounting said image display body on a head of the observer including the observer's face, said mount supporting means having, at least:

a sinciput contact member to be brought into contact with the head of the observer between a forehead and a crown thereof:

a left occiput contact member to be brought into contact, at a contact section thereof, with a lower portion of a left occiput of the observer located near and behind a left ear of the observer; and a right occiput contact member to be brought into contact, at a contact section thereof, with a lower portion of a right occiput of the observer located near and behind a right ear of the observer, wherein when said head mounted image display in mounted on the head of the observer so that said sinciput contact member, said contact section of said left occiput member and said contact section of said right occiput contact member come into contact with corresponding parts of the head, said image display body is supported by a contact force of said sinciput contact member and by resistance forces produced by the force of gravity acting on said image display body, said resistance forces acting against the contact sections of said left occiput contact member and said right occiput contact member at the respective lower portions of the left occiput and the right occiput of the observer, and said left occiput contact member and said right occiput contact member are spaced from each other with respect to a route along a surface of a middle occiput of the observer so that the middle occiput is free from contact with any member of said head mounted image display when mounted on the head of the observer.

2. A head mounted image display according to claim 1, further comprising contact member position adjusting means for changing a relative position of at least one of said sinciput contact member, said left occiput contact member, and said right occiput contact member with respect to said image display body.

3. A head mounted image display according to claims 1 or 2, wherein the contact sections of said left occiput contact member and said right occiput contact member to be brought into contact with the left occiput and the right occiput of the observer are constructed with elastic hollow pads.

4. A head mounted image display according to claim 3, wherein each of said elastic hollow pads is constructed of foamed urethane with an expansion rate of 20–80% and a compression rate of 0–⅓.

5. A head mounted image display according to claim 3, wherein each of said elastic hollow pads is constructed of rubber with a hardness of 30–60.

6. A head mounted image display according to claims 1 or 2, wherein a contact section of said sinciput contact member to be brought into contact with the head of the observer is positioned close to the center of gravity of said head mounted image display as a whole.

7. A head mounted image display according to claims 1 or 2, wherein said left occiput contact member and said right occiput contact member are constructed and arranged to exert elastic forces on the head.

8. A head mounted image display according to claims 1 or 2, wherein a contact section of said sinciput contact member to be brought into contact with the head of the observer is constructed of a man-made or natural leather.

9. A head mounted image display according to claims 1 or 2, wherein a contact section of said sinciput contact member to be brought into contact with the head of the observer is constructed of rubber with a hardness of 30–60.

10. A head mounted image display according to claims 1 or 2, wherein a contact section of said sinciput contact member to be brought into contact with the head of the observer is constructed of foamed urethane with an expansion rate of 20–80% and a compression rate of 0–⅓.

11. A head mounted image display according to claims 1 or 2, wherein said sinciput contact member is constructed of plastic.

12. A head mounted image display according to claims 1 or 2, wherein said sinciput contact member is constructed of polypropylene.

13. A head mounted image display according to claims 1 or 2, wherein said sinciput contact member is constructed of polyethylene.

14. A head mounted image display according to claims 1 or 2, wherein said sinciput contact member is constructed of metal.

15. A head mounted image display according to claims 1 or 2, wherein a contact section of said sinciput contact member to be brought into contact with the head of the observer is positioned at the center of gravity of said head mounted image display as a whole.

16. A head mounted image display according to claims 1 or 2, wherein said mount supporting means includes a main frame member for mounting said sinciput contact member, said left occiput contact member, and said right occiput contact member, said main frame member being constructed of plastic to which carbon is added.

17. A head mounting image display according to claims 1 or 2, wherein said mount supporting means includes a main frame member for mounting said sinciput contact member, said left occiput contact member, and said right occiput contact member, said main frame member being constructed of plastic to which glass is added.

18. A head mounted image display according to claims 1 or 2, wherein said mount supporting means includes a main frame member for mounting said sinciput contact member, said left occiput contact member, and said right occiput contact member, said main frame member being constructed of plastic to which metal is added.

19. A head mounted image display according to claim 2, wherein said contact member position adjusting means includes a ratchet system.

20. A head mounted image display according to claim 1, wherein said left occiput contact member and said right occiput contact member are arranged on a curve so as to conform to a shape of the left occiput and the right occiput of the observer.

21. A head mounted image display according to claim 1, wherein lengths of said left occiput contact member and said right occiput contact member are adjustable in a direction opposite to said image display body, with positional relationship between said image display body and said sinciput contact member remaining unchanged.

22. A head mounted image display according to claim 1, wherein said mount supporting means includes a main frame member and wherein respective lengths of said sinciput contact member, said left occiput contact member and said right occiput contact member from said main frame member are adjustable independent of one another, said main frame member being directly connected to said image display body.

23. A head mounted image display according to claim 1 further comprising a left speaker for the left ear of the observer and a right speaker for the right ear of the observer arranged separate from the contact sections of said left occiput contact member and said right occiput contact member.

* * * * *